(12) United States Patent
Chang et al.

(10) Patent No.: US 8,512,867 B2
(45) Date of Patent: Aug. 20, 2013

(54) COATED GLASS ARTICLE AND METHOD FOR MANUFACTURING SAME

(75) Inventors: Hsin-Pei Chang, New Taipei (TW);
Wen-Rong Chen, New Taipei (TW);
Huann-Wu Chiang, New Taipei (TW);
Cheng-Shi Chen, New Taipei (TW);
Cong Li, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/238,154

(22) Filed: Sep. 21, 2011

(65) Prior Publication Data
US 2012/0213989 A1 Aug. 23, 2012

(30) Foreign Application Priority Data
Feb. 21, 2011 (CN) .......................... 2011 1 0041467

(51) Int. Cl.
*B32B 15/04* (2006.01)
(52) U.S. Cl.
USPC ........... 428/432; 428/434; 428/689; 428/699; 428/701; 428/702; 428/704

(58) Field of Classification Search
USPC ................. 428/427, 432, 433, 434, 689, 699, 428/701, 702, 704
See application file for complete search history.

(56) References Cited

U.S. PATENT DOCUMENTS

| | | | | |
|---|---|---|---|---|
| 5,508,092 A | * | 4/1996 | Kimock et al. | 428/216 |
| 5,527,596 A | * | 6/1996 | Kimock et al. | 428/216 |
| 5,844,225 A | * | 12/1998 | Kimock et al. | 235/462.01 |
| 6,139,983 A | * | 10/2000 | Ohashi et al. | 428/698 |
| 7,968,205 B2 | * | 6/2011 | Nakano et al. | 428/469 |
| 7,988,836 B2 | * | 8/2011 | Veerasamy | 204/192.26 |
| 2002/0125822 A1 | * | 9/2002 | Graff et al. | 313/506 |
| 2004/0258926 A1 | * | 12/2004 | Veerasamy | 428/426 |
| 2005/0048284 A1 | * | 3/2005 | Veerasamy | 428/408 |
| 2009/0136702 A1 | * | 5/2009 | Gu | 428/49 |
| 2010/0032287 A1 | * | 2/2010 | Veerasamy | 204/192.1 |
| 2010/0098884 A1 | * | 4/2010 | Balseanu et al. | 427/577 |
| 2010/0313875 A1 | * | 12/2010 | Kennedy | 126/652 |
| 2011/0274854 A1 | * | 11/2011 | Veerasamy | 427/595 |
| 2012/0213989 A1 | * | 8/2012 | Chang et al. | 428/336 |

\* cited by examiner

*Primary Examiner* — Mark Ruthkosky
*Assistant Examiner* — Lauren Colgan
(74) *Attorney, Agent, or Firm* — Altis Law Group, Inc.

(57) ABSTRACT

A very protective coated glass article includes a glass substrate, a bond enhancing layer formed on the glass substrate and a boron carbide layer deposited on the bond enhancing layer. A method of manufacturing the coated glass article is provided.

8 Claims, 2 Drawing Sheets

COATED GLASS ARTICLE AND METHOD FOR MANUFACTURING SAME

BACKGROUND

1. Technical Field

The present disclosure relates to coated glass articles, particularly to a coated glass article having a high oxidation resistance and a high abrasion and scratch resistance, and a method for manufacturing the coated glass article.

2. Description of Related Art

Glass may be coated with a thin reflective coating (e.g., silver layer, aluminum layer or copper layer) to have the properties of high visible light transmission and a high heat resistance. However, the coatings may have a low oxidation resistance and a low abrasion and scratch resistance.

Polythene films are often attached to the coatings to protect the coatings from abrasions and scratches. However, the polythene films may be thrown off from the coating during installation or use, and then the polythene films are not reusable. The polythene films are not bio-degradable.

Therefore, there is room for improvement within the art.

BRIEF DESCRIPTION OF THE FIGURES

Many aspects of the embodiments can be better understood with reference to the following drawings. The components in the drawings are not necessarily drawn to scale, the emphasis instead being placed upon clearly illustrating the principles of the exemplary coated glass article and a method for manufacturing the coated glass article. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
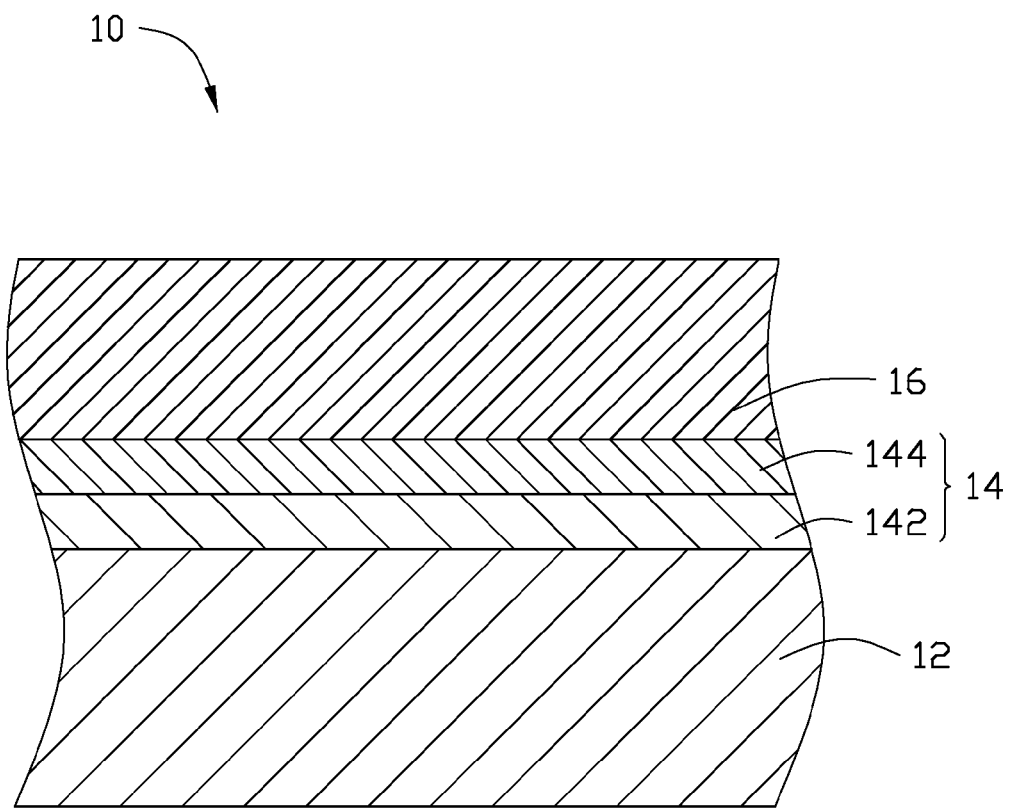
FIG. 1 is a cross-section of a coated glass article according to an exemplary embodiment.

FIG. 1 shows an embodiment of a coated glass article 10 including a glass substrate 12, a bond enhancing layer 14 deposited on the glass substrate 12, and a boron carbide ($B_4C$) layer 16 deposited on the bond enhancing layer 14. The bond enhancing layer 14 has a thickness of about 10 nanometers (nm) to about 120 nm. The boron carbide layer 16 has a thickness of about 10 nm to about 60 nm.

The bond enhancing layer 14 is deposited on the glass substrate 12 by magnetron sputtering. The bond enhancing layer 14 includes a first bond enhancing layer 142 and a second bond enhancing layer 144. The first bond enhancing layer 142 abuts against the glass substrate 12, and the second bond enhancing layer 144 abuts against the boron carbide layer 16. The first bond enhancing layer 142 enhances the bonding between the glass substrate 12 and the second bond enhancing layer 144. The first bond enhancing layer 142 can be made of a single material such as silicon nitride ($Si_3N_4$), titanium nitride ($Ti_3N_4$), titanium oxide ($TiO_2$), silicon oxide ($SiO_2$) and zinc oxide (ZnO). The second bond enhancing layer 144 can bond enhancing to filter ultraviolet light, reduce heat radiation or to have a self-cleaning action. The second bond enhancing layer 144 can be made of material selected from one of nickel chromium (NiCr), silver (Ag), aluminum (Al) and copper (Cu).

Figure 2:
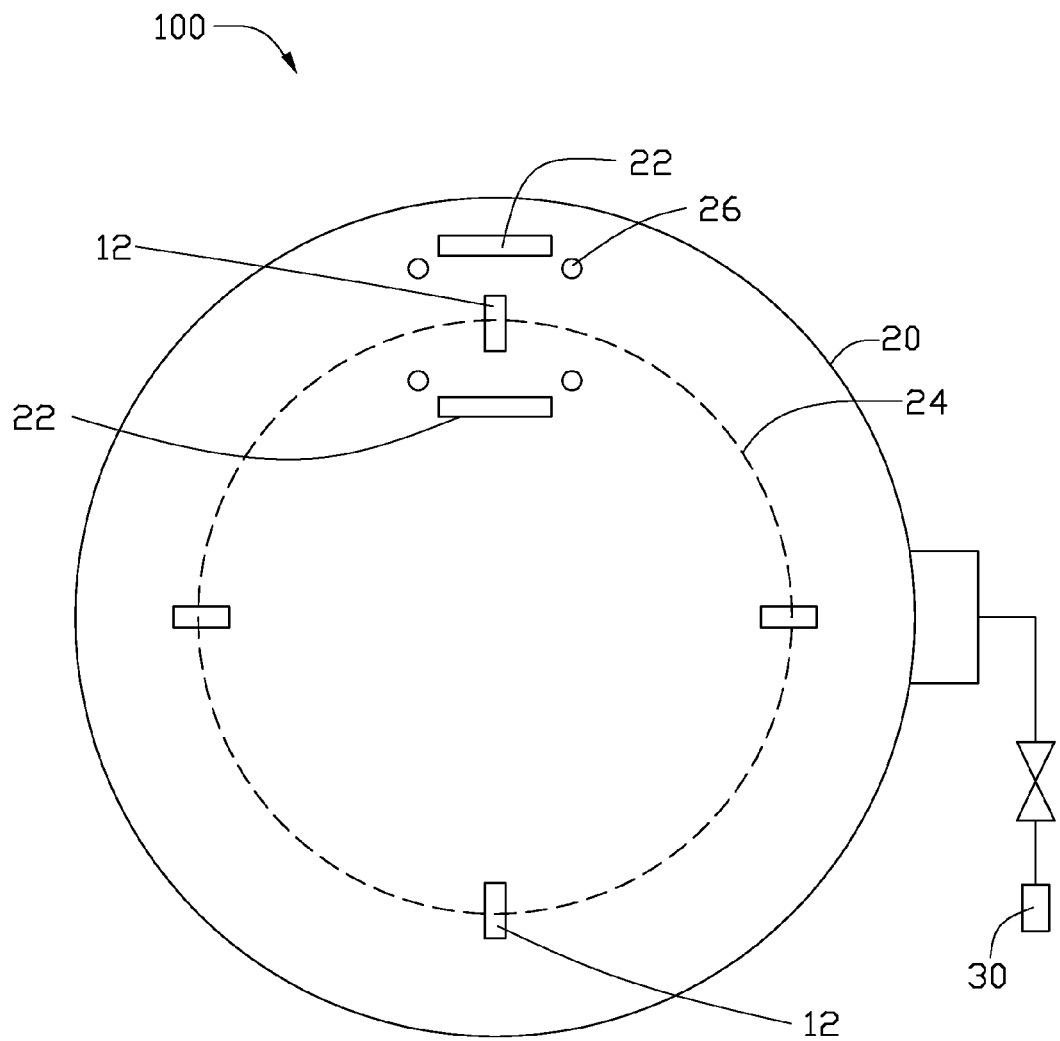
FIG. 2 is a schematic view of a vacuum sputtering coating machine for manufacturing the coated glass article of FIG. 1

Referring to FIG. 2, a method for manufacturing the coated glass article 10 may include at least the following steps:

Providing a glass substrate 12.

Pretreating the glass substrate 12. The pretreating process may include the step of polishing the surfaces of the glass substrate 12. Then, the glass substrate 12 is cleaned by placing it into an organic solution to remove grease from its surfaces. The organic solution can be ethanol, or other organic solvents. Then, the glass substrate 12 is rinsed with water and dried.

Providing a vacuum sputtering coating machine 100. Referring to FIG. 2, the vacuum sputtering coating machine 100 includes a sputtering coating chamber 20 and a vacuum pump 30 communicating with the sputtering coating chamber 20. The vacuum pump 30 is used to evacuate the sputtering coating chamber 20. The vacuum sputtering coating machine 100 further includes two first targets 22, two second targets 23, two third targets 24, a rotating bracket 25 and a plurality of gas inlets 26. The rotating bracket 25 rotates the glass substrate 12 in the sputtering coating chamber 20 relative to the third targets 24. The two first targets 22 face each other, and are located on opposite sides of the rotating bracket 25, and the same arrangement is applied to the two second targets 23 and the third targets 24. In this exemplary embodiment, the first targets 22 are made of silicon, titanium or zinc, the second targets 23 are made of NiCr, Ag, Al or Cu, the third targets 24 are made of boron.

Depositing a first bond enhancing layer 142 on the pretreated glass substrate 12. The glass substrate 12 is positioned in the vacuum sputtering coating machine 100. The vacuum level inside the sputtering coating chamber 20 is evacuated to about $8.0 \times 10^{-3}$ Pa (Pascals). The inside of the sputtering coating chamber is heated to from about 100° C. (degrees Celsius) to about 420° C. Argon (Ar) may be used as a working gas and is fed into the sputtering coating chamber 20 at a flow rate of about 200 sccm (standard cubic centimeters per minute) to about 400 sccm. Oxygen ($O_2$) or Nitrogen ($N_2$) may be used as the reaction gas. Oxygen may have a flow rate of about 25 sccm to about 55 sccm, nitrogen may have a flow rate of about 40 sccm to about 75 sccm. Electrical power is applied to the first targets 22 fixed in the sputtering coating chamber 20 are evaporated at a power between about 5 kW (kilowatts) to about 8 kW, and the glass substrate 12 may have a negative bias voltage of about −50 V (volts) to about −300 V, to deposit the fist bond enhancing layer 142 on the glass substrate 12. The deposition of the fist bond enhancing layer 142 may take from about 15 minutes (min) to about 30 min Depositing a second bond enhancing layer 144 on the fist bond enhancing layer 142. The vacuum level inside the sputtering coating chamber 20 is evacuated to about $8.0 \times 10^{-3}$ Pa. The inside of the sputtering coating chamber is heated to from about 100° C. (degrees Celsius) to about 420° C. Argon may be used as the working gas and is fed into sputtering coating chamber 20 at a flow rate of about 200 sccm to about 400 sccm. Power is applied to the second targets 23 fixed in the sputtering coating chamber 20 are evaporated at a power between about 10 kW to about 15 kW, and the glass substrate 12 may have a negative bias voltage of about −50 V to about −300 V applied to it, to deposit the second bond enhancing layer 144 on the fist bond enhancing layer 142. The deposition of the second bond enhancing layer 144 may take from about 15 min to about 30 min.

Depositing the boron carbide layer 16 on the second bond enhancing layer 144. The vacuum level inside the sputtering coating chamber 20 is evacuated to about $8.0 \times 10^{-3}$ Pa. The inside of the sputtering coating chamber is heated to from about 100° C. (degrees Celsius) to about 420° C. Argon may be used as the working gas and is fed into sputtering coating chamber 20 at a flow rate of about 200 sccm to about 400 sccm. Acetylene gas ($C_2H_2$) may be used as the reaction gas and have a flow rate of about 60 sccm to about 125 sccm. Power is applied to the third targets 24 fixed in the sputtering coating chamber 20 are evaporated at a power between about 1 kW to about 20 kW, and the glass substrate 12 may have a negative bias voltage of about −50 V to about −300 V applied to it, to deposit the boron carbide layer 16 on the first bond enhancing layer 144. The deposition of the boron carbide layer 16 may take from about 10 min to about 60 min.

EXAMPLES

Example 1

1. Depositing a first bond enhancing layer 142 on the glass substrate 12.

A sample of glass substrate 12 was pretreated and then was placed into the sputtering coating chamber 20 of the vacuum sputtering coating machine 100. The temperature in the sputtering coating chamber 20 was set at 100° C. . Oxygen ($O_2$) was used as the reaction gas and fed into the sputtering coating chamber 20 at a flow rate of 55 sccm. The first targets 22 in the sputtering coating chamber 20 were evaporated at a power 8 kW. A bias voltage was applied to the glass substrate 12 at −50 volts for 15 minutes to deposit a fist bond enhancing layer 142 on the glass substrate 12. In this exemplary embodiment, the first targets 22 were made of Silicon.

2. Depositing a second bond enhancing layer 144 on the first bond enhancing layer 142.

The temperature in the sputtering coating chamber 20 was set at 100° C. The second targets 22 in the sputtering coating chamber 20 were evaporated at a power 10 kW. A bias voltage was applied to the glass substrate 12 at −50 volts for 15 minutes to deposit a second bond enhancing layer 144 on the fist bond enhancing layer 142. In this exemplary embodiment, the second targets 22 were made of Aluminum.

3. Depositing the boron carbide layer 16 on the second bond enhancing layer 144.

The temperature in the sputtering coating chamber 20 was set at 100° C. Acetylene was fed into the sputtering coating chamber 20 at a flow rate of 60 sccm. The third targets 24 in the sputtering coating chamber 20 were evaporated at a power 1 kW. A bias voltage was applied to the glass substrate 12 at −50 volts for 10 minutes to deposit a boron carbide layer 16 onto the glass substrate 12.

Example 2

Unlike example 1, in the example 2, during the deposition of the boron carbide layer 16 on the second bond enhancing layer 144, the temperature in the sputtering coating chamber 20 was set at 220° C. Acetylene was fed into the sputtering coating chamber 20 at a flow rate of 80 sccm. The third targets 24 in the sputtering coating chamber 20 were evaporated at a power 10 kW. A bias voltage was applied to the glass substrate 12 at −150 volts for 10 minutes, to deposit a boron carbide layer on the glass substrate 12. Except for the above difference, the remaining experimental conditions for example 2 were same as for example 1.

Example 3

Unlike example 1, in example 2, during the deposition of the boron carbide layer 16 on the second bond enhancing layer 144, the temperature in the sputtering coating chamber 20 was set at 420° C. Acetylene was fed into the sputtering coating chamber 20 at a flow rate of 125 sccm. The third targets 24 in the sputtering coating chamber 20 were evaporated at a power 20 kW. A bias voltage was applied to the glass substrate 12 at −300 volts for 60 minutes, to deposit a boron carbide layer on the glass substrate 12. Except for the above difference(s), the remaining experimental conditions for example 3 were same as for example 1.

Examples Results

The coated glass article 10 manufactured as a result of examples 1, 2 and 3 had high-temperature oxidation and abrasion tests performed on them.

High-temperature oxidation test: the coated glass articles 10 were put into a tube furnace. The temperature inside the tube furnace was raised by 5° C. per minute until 300° C. was reached. Then, the temperature inside the tube furnace was maintained at 300° C. for 10 hours. The coated glass articles 10 were removed from the tube furnace and showed no peeling or oxidation. Thus, the coated glass articles 10 manufactured by above method had good oxidation resistance.

Abrasion test: the coated glass articles 10 were tested by a linear abrader with a force of 1 kg, the stroke length was 1.5 inch, the frequency was 25 times per minute. The coated glass article 10 produced in examples 1, 2 and 3 showed no scratches or abrasions after being worn 130 times for 5.2 minutes. Thus, the coated glass articles 10 manufactured by the above method(s) had a good corrosion resistance.

According to the above description, the boron carbide layer 16 has a high hardness and oxidation resistance. The boron carbide layer 16 used in coating the bond enhancing layer 14 can protect the bond enhancing layer 14 from abrasions and scratches. Thus, polythene film is not necessary for protecting the bond enhancing layer 14.

It is to be understood, however, that even through numerous characteristics and advantages of the exemplary disclosure have been set forth in the foregoing description, together with details of the system and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A coated glass article, comprising:
   a glass substrate;
   a bond enhancing layer formed on the glass substrate by magnetron sputtering, the bond enhancing layer having a thickness of about 10 nm to about 120 nm;
   a boron carbide layer deposited on the bond enhancing layer; and wherein the bond enhancing layer includes a first bond enhancing layer and a second bond enhancing layer, a first surface of the first bond enhancing layer abuts against a first surface of the second bond enhancing layer, the opposite surface of the first bond enhancing layer abuts against the glass substrate, the opposite surface of the second bond enhancing layer abuts against the boron carbide layer, and the second bond enhancing layer is made of one material selected from a group consisting of nickel chromium, silver, aluminum and copper.

2. The coated glass article as claimed in claim 1, wherein the first bond enhancing layer is made of one material selected from a group consisting of silicon nitride, titanium nitride, titanium oxide, silicon oxide and zinc oxide.

3. The coated glass article as claimed in claim 2, wherein the boron carbide layer has a thickness of about 10 nm to about 60 nm.

4. The coated glass article as claimed in claim 1, wherein the boron carbide layer has a thickness of about 10 nm to about 60 nm.

5. The coated glass article as claimed in claim 1, wherein the boron carbide layer is deposited by magnetron sputtering.

6. A method for manufacturing the coated glass article of claim 1, comprising:
   providing a glass substrate;
   depositing a bond enhancing layer on the glass substrate; and
   depositing a boron carbide layer on the bond enhancing layer, wherein the boron carbide layer is deposited by magnetron sputtering process using boron as a target and acetylene gas as reaction gas.

7. The method of claim 6, wherein during depositing of the boron carbide layer on the bond enhancing layer, the substrate is retained in a sputtering coating chamber of a vacuum sputtering coating machine; the inside of the sputtering coating chamber is evacuated and heated to from about 100° C. to about 420° C.; acetylene gas is fed into sputtering coating chamber at a flow rate of about 60 sccm to about 125 sccm; the boron targets fixed in the sputtering coating chamber are evaporated at a power between about 1 kW to about 20 kW; the substrate is biased with a negative bias voltage of about −50 V to about −300 V; vacuum sputtering the tin layer takes about 10 min to about 60 min.

8. The method of claim 6, wherein the first bond enhancing layer made of one material selected from a group consisting of silicon nitride, titanium nitride, titanium oxide, silicon oxide and zinc oxide.

* * * * *